United States Patent
Seo et al.

(10) Patent No.: US 10,057,852 B2
(45) Date of Patent: Aug. 21, 2018

(54) POWER CONTROL METHOD AND APPARATUS OF USER EQUIPMENT USING MULTI-FREQUENCY

(71) Applicant: Samsung Electronics Co., Ltd., Gyeonggi-do (KR)

(72) Inventors: Jongwon Seo, Gyeonggi-do (KR); Kyeongjun Kim, Gyeonggi-do (KR); Moonheui Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 392 days.

(21) Appl. No.: 14/300,706

(22) Filed: Jun. 10, 2014

(65) Prior Publication Data

US 2014/0362753 A1 Dec. 11, 2014

(30) Foreign Application Priority Data

Jun. 10, 2013 (KR) ........................ 10-2013-0066146

(51) Int. Cl.
*H04W 52/02* (2009.01)
(52) U.S. Cl.
CPC ......... *H04W 52/0229* (2013.01); *Y02D 70/00* (2018.01); *Y02D 70/1242* (2018.01); *Y02D 70/1262* (2018.01); *Y02D 70/1264* (2018.01); *Y02D 70/23* (2018.01)
(58) Field of Classification Search
CPC ........... H04W 72/042; H04W 72/0406; H04W 52/146; H04W 88/02; H04W 76/048; H04W 36/0055; H04W 72/1289; H04W 36/28; H04W 72/02; H04W 76/064; H04W 52/02; H04L 5/001; H04L 5/0058; H04L 5/0096
See application file for complete search history.

(56) References Cited

U.S. PATENT DOCUMENTS

| | | | | |
|---|---|---|---|---|
| 2011/0170420 A1* | 7/2011 | Xi | ........................... | H04L 5/001 370/241 |
| 2012/0182912 A1* | 7/2012 | Watfa | ................ | H04W 36/0022 370/311 |
| 2013/0064162 A1* | 3/2013 | Phan | ....................... | H04W 8/22 370/312 |
| 2013/0136094 A1* | 5/2013 | Wei | ................... | H04W 52/0203 370/329 |
| 2013/0343296 A1* | 12/2013 | Dinan | ................... | H04W 76/02 370/329 |
| 2014/0064129 A1* | 3/2014 | Sane | ..................... | H04W 24/10 370/252 |

* cited by examiner

*Primary Examiner* — Awet Haile
(74) *Attorney, Agent, or Firm* — The Farrell Law Firm, P.C.

(57) ABSTRACT

A power control method and an apparatus for controlling power mode of a User Equipment (UE) operating on multiple frequencies are provided. The terminal includes a primary module for primary cell communication and a secondary module for secondary cell communication. The method includes receiving a secondary cell adding message for adding a secondary cell from a base station, checking data-related information on data communicated through at least one of the primary module and a secondary module, and determining a power mode of the secondary module based on the checking.

10 Claims, 14 Drawing Sheets

POWER CONTROL METHOD AND APPARATUS OF USER EQUIPMENT USING MULTI-FREQUENCY

PRIORITY

This application claims priority under 35 U.S.C. § 119(a) to a Korean Patent Application filed in the Korean Intellectual Property Office on Jun. 10, 2013 and assigned Serial No. 10-2013-0066146, the entire content of which is incorporated herein by reference.

BACKGROUND

1. Field of the Invention

The present invention relates generally to a wireless communication system using multi-carrier and, in particular, to a method and apparatus for controlling a power mode of a User Equipment (UE) operating on multiple frequencies.

2. Description of the Related Art

Standardization for a Long Term Evolution (LTE) system, i.e., a next-generation mobile communication system, is underway in the 3rd Generation Partnership Project (3GPP). LTE is a technology for realizing high-speed packet-based communication at a data rate higher than is currently available.

In line with the completion of the LTE standardization, an LTE-Advanced (LTE-A) system is now under discussion, which improves a transfer rate by combining the LTE communication system with several new technologies. One of the representative technologies adopted newly is Carrier Aggregation (CA) based on the use of multiple frequencies.

Unlike the conventional data communication in which a UE uses one downlink carrier and one uplink carrier, carrier aggregation allows a UE to use multiple downlink carriers and multiple uplink carriers. A UE capable of using carrier aggregation technology is referred to as an LTE CA UE.

However, using the LTE CA UE as a multi-frequency-enabled UE has a drawback in that, when one or more carriers is added when using one carrier, a coupling circuit of a Radio Frequency (RF) module and modem in the LTE CA UE consumes electricity. For example, the RF-related module consumes electricity even when there is no traffic flow.

FIG. 1 is a diagram illustrating an LTE system architecture to which various embodiments of the present invention are applied.

Referring to FIG. 1, a radio access network of a mobile communication system includes evolved Node Bs (eNBs) 105, 110, 115, and 120, a Mobility Management Entity (MME) 125, and a Serving-Gateway (S-GW) 130. A User Equipment (UE) 135 connects to an external network via eNBs 105, 110, 115, and 120 and the S-GW 130.

In FIG. 1, the eNBs 105, 110, 115, and 120 correspond to legacy node Bs of a Universal Mobile Telecommunications System (UMTS) system. The eNBs allow the UE 135 to establish a radio channel and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as buffer states, power headroom states, and channel states of the UEs.

Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE.

The S-GW 130 provides data bearers so as to establish and release data bearers under the control of the MME 125.

The MME 125 is responsible for mobility management of UEs and various control functions. The MME 1235 may be connected to a plurality of eNBs.

FIG. 2 is a diagram illustrating a protocol stack of an LTE system to which various embodiments of the present invention are applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical Layer (PHY) 220 and 225.

The PDCP 205 and 240 are responsible for IP header compression/decompression, and the RLC 210 and 235 are responsible for segmenting the PDCP Protocol Data Unit (PDU) into segments in appropriate size for Automatic Repeat Request (ARQ) operation.

The MAC 215 and 230 are responsible for establishing connection to a plurality of RLC entities so as to multiplex the RLC PDUs into MAC PDUs and demultiplex the MAC PDUs into RLC PDUs.

The PHY 220 and 225 perform channel coding on the MAC PDU and modulate the MAC PDU into OFDM symbols to transmit over radio channel or perform demodulating and channel-decoding on the received OFDM symbols and deliver the decoded data to the higher layer.

FIG. 3 is a diagram illustrating intra-eNB Carrier Aggregation (CA).

Referring to FIG. 3, an eNB transmits and receives signals through multiple carriers across a plurality of frequency bands. For example, when the eNB 305 is configured to use the downlink carrier 315 with center frequency f1 and the downlink carrier 310 with center frequency f3, the conventional UE receives data on one of the two carriers.

However, the CA-enabled UE (or multi-frequency UE) is capable of transmitting/receiving data on multiple carriers simultaneously. The eNB 305 may allocate extra carriers to the CA-enabled UE 330 to increased data rate of the UE 330 depending on the situation.

Aggregating the downlink carriers or uplink carriers of one eNB is referred to as intra-eNB CA. However, the CA can be implemented by aggregating downlink carriers or uplink carriers of different eNBs.

FIG. 4 is a diagram illustrating inter-eNB CA.

Referring to FIG. 4, the eNB 1 405 uses a carrier with center frequency f1 and the eNB 2 415 uses another carrier with center frequency f2. If the carrier with center frequency f1 and the carrier with center frequency f2 are aggregated for the UE 430, this means that the carriers of two different eNBs are aggregated for one UE.

SUMMARY

The present invention has been made to address at least the above problems and/or disadvantages and to provide at least the advantages described below. Accordingly, an aspect of the present invention is to provide a method and an apparatus for controlling a power mode of a multi-frequency UE using at least two carriers.

In accordance with an aspect of the present invention, a power control method of a terminal including a primary module for primary cell communication and at least one secondary module for secondary cell communication in a wireless communication system is provided. The power control method includes receiving, from a base station, a secondary cell adding message for adding a secondary cell, checking data-related information on data communicated through at least one of the primary module and the at least one secondary module, and determining a power mode of the at least one secondary module based on the checking.

In accordance with another aspect of the present invention, a message transmission method of a base station in a wireless communication system is provided. The message transmission method includes transmitting, to a terminal, a primary cell configuration message for configuring a primary cell, checking data-related information on data to communicate with the terminal, and determining whether to transmit a secondary cell adding message for configuring a secondary cell to the terminal based on the checking.

In accordance with another aspect of the present invention, a terminal is provided. The terminal includes a primary module configured to communicate through a primary cell, a secondary module configured to communicate through a secondary cell, and a control unit configured to check, a secondary cell adding message, from a base station, for adding the secondary cell, data-related information on data communicated through at least one of the primary module and the secondary module, and to determine a power mode of the secondary module based on the checking.

In accordance with still another aspect of the present invention, a base station of a wireless communication system is provided. The base station includes a transceiver configured to communicate signals with a terminal, and a control unit configured to transmit a primary cell configuration message for configuring a primary cell to the terminal, to check data-related information on data to communicate with the terminal, and to determine whether to transmit a secondary cell adding message for configuring a secondary cell to the terminal based on the checking.

In accordance with still another aspect of the present invention, a power control method of a terminal including a primary communication module and a secondary communication module is provided. The method includes receiving a secondary communication module adding message from a base station, checking information on data communicated through the primary communication module, and determining a power mode of the secondary communication module based on the checked information.

BRIEF DESCRIPTION OF THE DRAWINGS

The above and other aspects, advantages, and features of the present invention will become apparent to those skilled in the art from the following detailed description, taken in conjunction with the annexed drawings, in which.

DETAILED DESCRIPTION OF EMBODIMENTS OF THE PRESENT INVENTION

Embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Although various embodiments of the present invention are directed to the Advanced Evolved Universal Terrestrial Radio Access (E-UTRA) (or Long Term Evolution (LTE) Advanced (LTE-A)) supporting carrier aggregation, it will be understood by those skilled in the art that the subject matter of the present invention can be applied to other communication systems having the similar technical background and channel format, with a slight modification, without departing from the spirit and scope of the present invention.

Detailed description of well-known functions and structures incorporated herein may be omitted to avoid obscuring the subject matter of the present invention. Various embodiments of the present invention are described hereinafter with reference to the accompanying drawings.

Assuming that a cell is configured with one downlink carrier and one uplink carrier, the carrier aggregation can be understood as the UE communicates data via multiple cells. With the use of carrier aggregation, the peak data rate increases in proportion to the number of aggregated carriers.

In the following description, if a UE receives data through a certain downlink carrier or transmits data through a certain uplink carrier, the UE receives or transmits data through control and data channels provided in cells corresponding to center frequencies and frequency bands characterizing the carriers. In the present invention, carrier aggregation may be expressed to configure a plurality of serving cells such as a primary cell and a secondary cell. In this case, the primary serving cell is referred to as PCell and the secondary serving cell as SCell.

Figure 1:
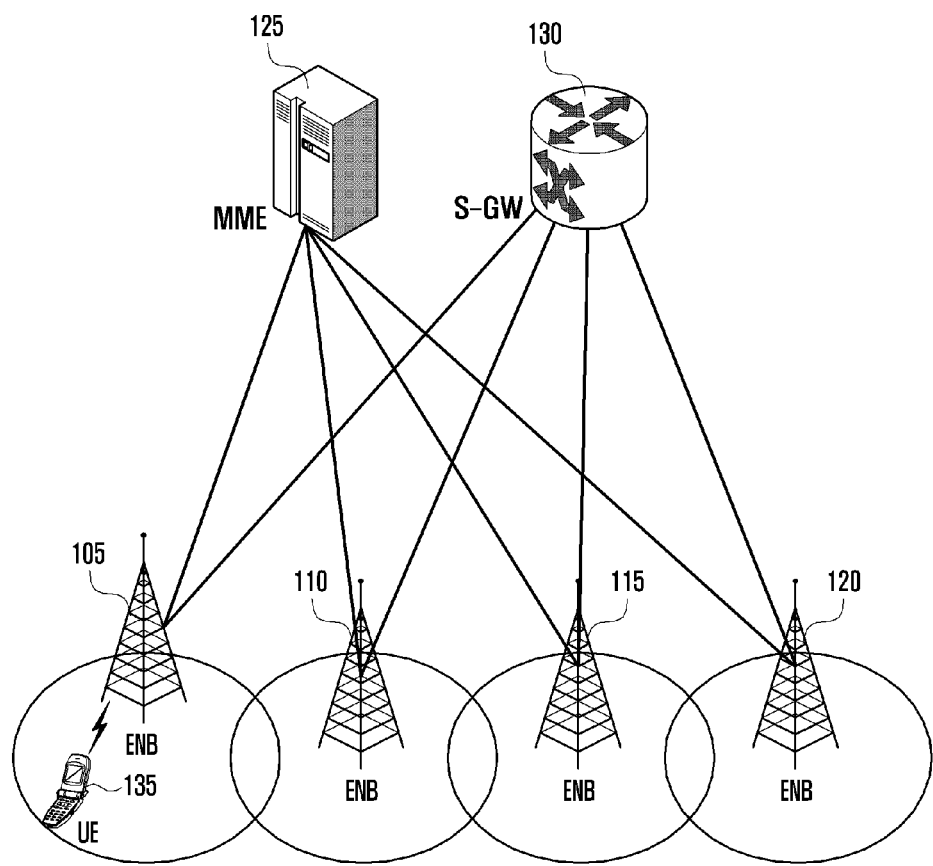
FIG. 1 is a diagram illustrating Long Term Evolution (LTE) system architecture to which embodiments of the present invention are applied.
Figure 2:
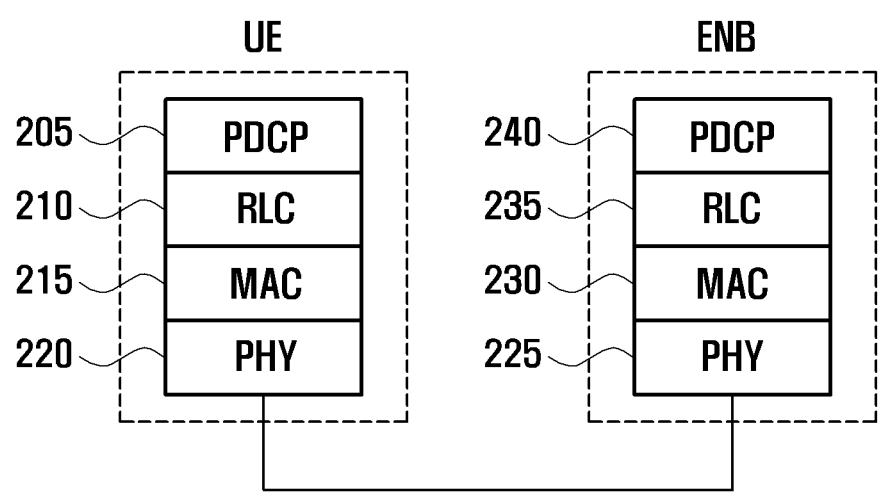
FIG. 2 is a diagram illustrating a protocol stack of an LTE system to which various embodiments of the present invention are applied.
Figure 3:
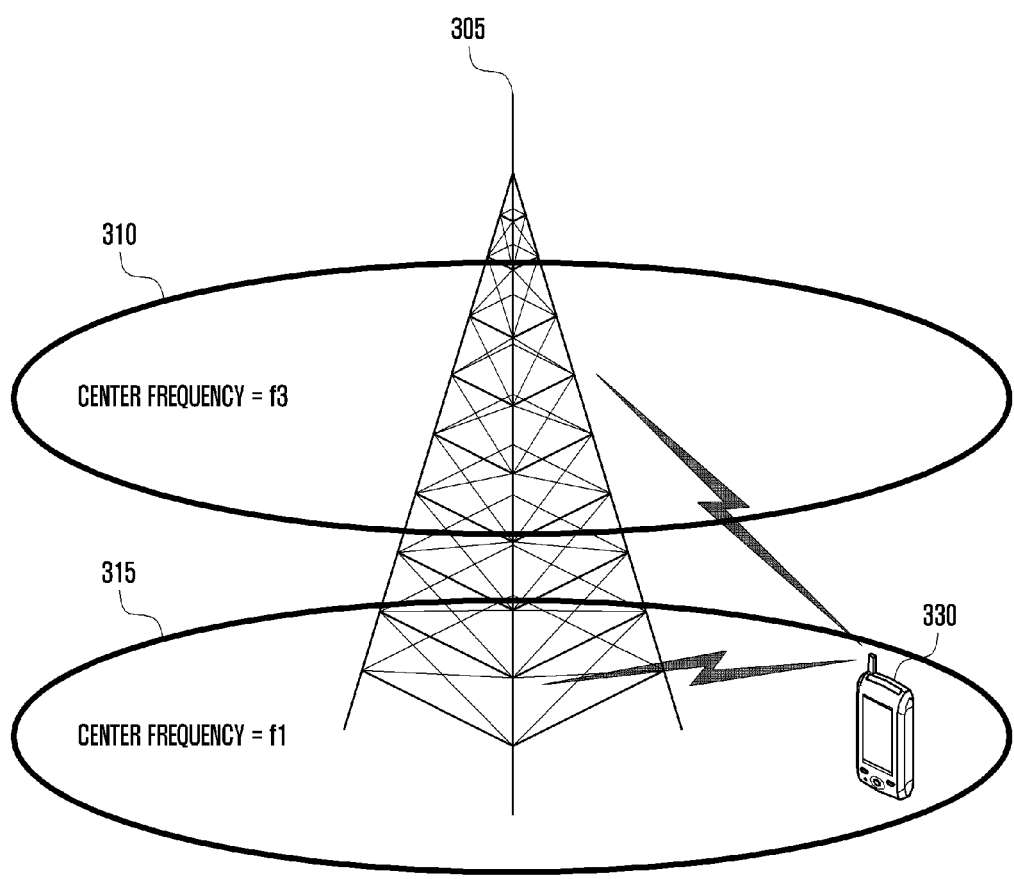
FIG. 3 is a diagram illustrating intra-evolved Node Bs (eNB) carrier aggregation.
Figure 4:
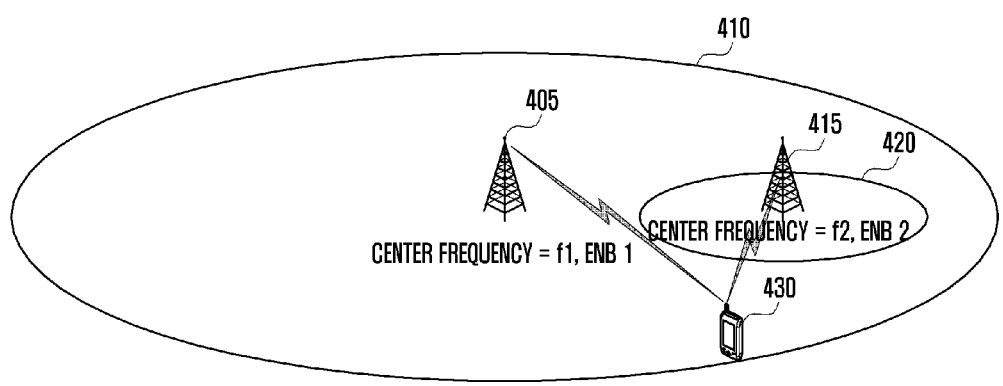
FIG. 4 is a diagram illustrating inter-eNB carrier aggregation.
Figure 5:
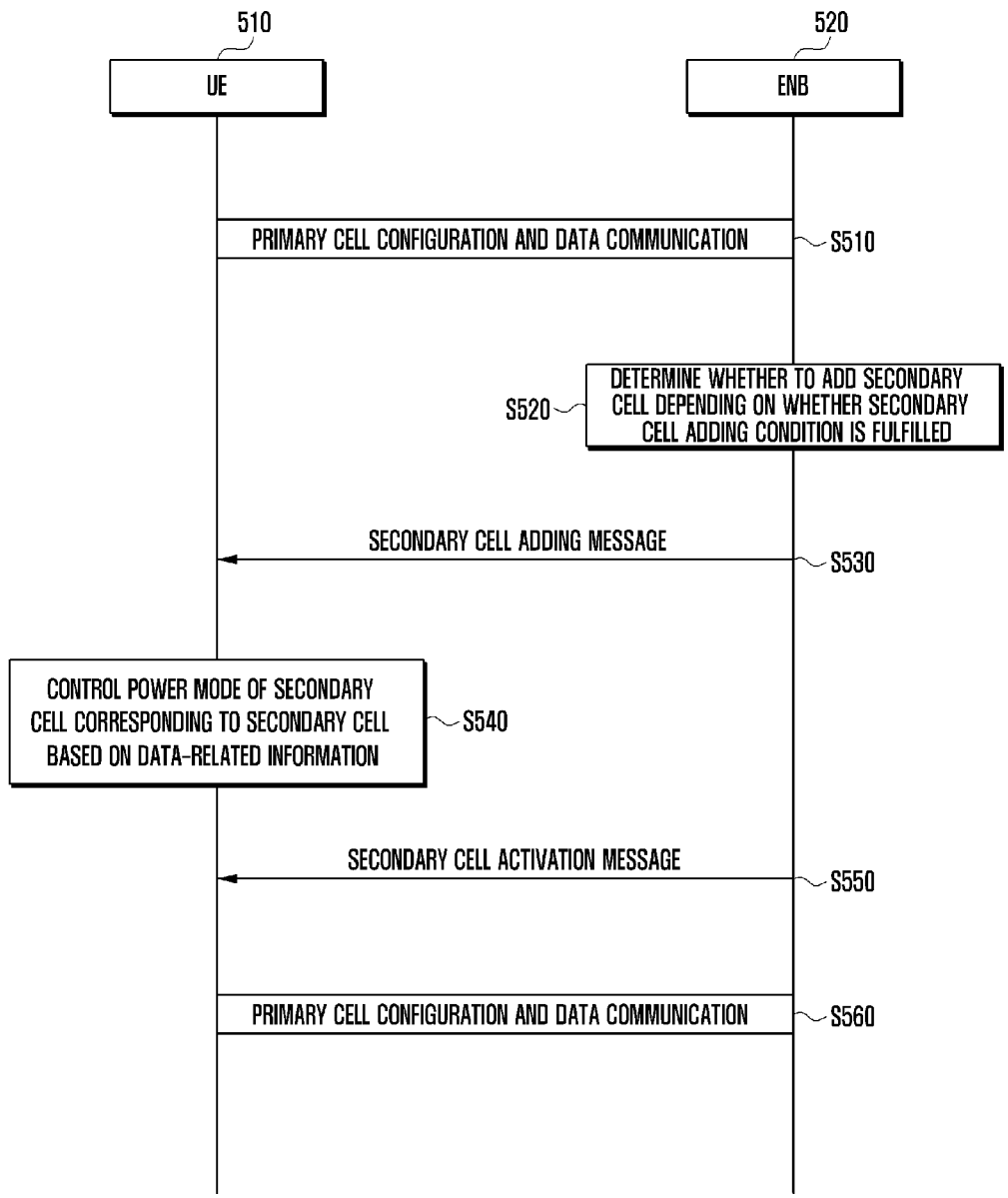
FIG. 5 is a signal flow diagram illustrating signal flows between a UE and an eNB according to an embodiment of the present invention.

FIG. 5 is a signal flow diagram illustrating signal flows between a UE and an eNB according to an embodiment of the present invention.

As shown in FIG. 5, the UE 510 is an LTE-CA UE, which is capable of operating on multiple frequencies and supporting CA-based communication in the LTE-A network according to an embodiment of the present invention.

For example, the UE 510 communicates with the eNB 520 through the primary and secondary cells and includes a primary module for primary cell communication and a secondary module for secondary cell communication.

The primary module includes a primary RF module for radio frequency communication on the primary frequency and a primary modem for coding/decoding and modulation/demodulation. The secondary module includes a secondary RF module for radio frequency communication on the secondary frequency and a secondary modem for coding/decoding and modulation/demodulation.

At step S510, the UE 510 and the eNB 520 configure the primary cell for communicating data therebetween.

At step S520, the eNB 520 determines whether a condition for adding a secondary cell to the UE 510 is fulfilled. The eNB 520 determines whether to add the secondary cell to the UE 510 depending on whether the secondary cell adding condition is fulfilled.

To determine whether the secondary cell adding condition is fulfilled, the eNB 520 checks the information on the data to be communicated with the UE 510. The data-related information may include at least one of size of data per second for input to the buffer of the eNB, whether it corresponds to a specific bearer, whether it is connected to a preset Packet Data Network (PDN), and preset service type. The data-related information is described below in detail.

If it is determined that the secondary cell adding condition is fulfilled, the eNB 520 sends the UE 510 a secondary cell adding message at step S530. In the various embodiments of the present invention, the cell adding message may be a SCell Configuration message, or a higher layer message, and the higher layer message may be a Radio Resource Control (RRC) message, e.g. a RRCConnectionReconfiguration message.

At step S540, the UE 510 checks the information on the data transmitted/received through one of the primary and secondary modules. The UE 510 controls the power mode of the secondary module corresponding to the secondary cell according to the check result.

To check the data-related information, the UE checks at least one of throughput of the primary cell, type of application running on the UE, whether it is connected to the present PDN, and preset service type. The data-related information is described below in detail.

According to an embodiment of the present invention, to control the power mode of the secondary module, the UE configures the power mode of the secondary module to a power saving mode. According to various embodiments of the present invention, the power saving mode configuration may include that the UE 510 controls to cut off or block the power to the RF module included in the secondary module, or that the UE 510 controls to cut off or block the power to at least one sub-block of the modem of the secondary module.

At step S550, the eNB 520 sends the UE 510 an activation message for activating the secondary cell. The activation message may be referred to as a secondary carrier control message and may be the Activation MAC Control Element (CE) message (i.e., opposite to the deactivation message for deactivating the secondary cell, e.g. Deactivation MAC CE, which is described below).

Then, the UE 510 may supply power to the secondary module.

At step S560, the eNB 520 and the UE 510 communicates data through at least one of the primary and secondary cells.

Although FIG. 5 shows both the secondary cell adding message transmission operation of the eNB 520 and the secondary module power mode control operation of the UE 510, it is noted that these operations of the UE 510 and the eNB 520 may also be performed independently.

Figure 6:
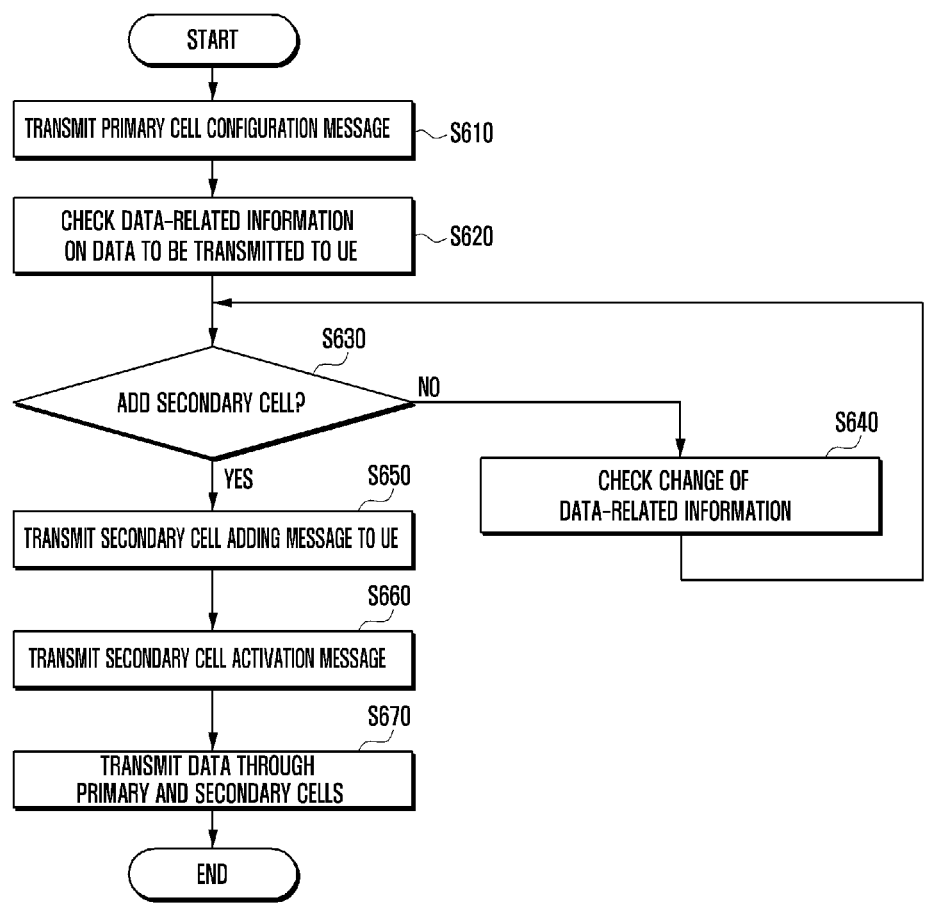
FIG. 6 is a flowchart illustrating a procedure of an eNB according to an embodiment of the present invention.

FIG. 6 is a flowchart illustrating a procedure of an eNB according to an embodiment of the present invention.

Referring to FIG. 6, the eNB sends the UE a primary cell configuration message at step S610. The eNB checks the data-related information on the data to be transmitted to the UE at step S620. The data-related information may include at least one of size of date per second for input to the buffer of the eNB, whether it corresponds to a specific bearer, whether it is connected to a preset PDN, and preset service type.

For example, the eNB calculates the size of data input to the buffer per unit time. The eNB determines configuration of extra secondary cell only when the data rate is maintained for predetermined time duration. As another example, the eNB determines to add the secondary cell to the UE only when the data rate of 5 Mbps is maintained for 5 seconds.

According to various embodiments of the present invention, if it is possible to discriminate among bearers, the eNB is capable of determining whether to add the secondary cell per bearer. For example, the eNB determines whether to add secondary cell depending on the type of the application running on the eNB or the UE. As another example, if the bearer established with the UE is Voice Over LTE, the eNB determines to add secondary cell to the UE.

According to various embodiments of the present invention, if the UE connects to a certain PDN, the eNB determines whether to add a secondary cell depending on the PDN to connect. The PDN may be classified into one of intranet, Internet, and private network.

According to various embodiments of the present invention, if it is possible to discriminate among services such as Transmission Control Protocol (TCP) service, the eNB determines whether to add a secondary cell depending on the type of the service.

At step S630, the eNB determines whether it is necessary to add a secondary cell for the UE based on the check result on the data-related information. If it is not necessary to add a secondary cell, the eNB monitors to check change of the data-related information at step S640. For example, the eNB monitors to determine whether the size of the data input to the buffer per unit time changes.

If it is necessary to add a second cell, the eNB sends the UE a secondary cell adding message at step S650. As described above, according to various embodiments of the present invention, the secondary cell adding message may be the SCell Configuration message or a higher layer message, e.g. Radio Resource Control (RRC) message.

At step S660, the eNB sends the UE a secondary cell activation message.

At step S670, the eNB sends the UE the data through at least one of the primary and secondary cells.

Figure 7:
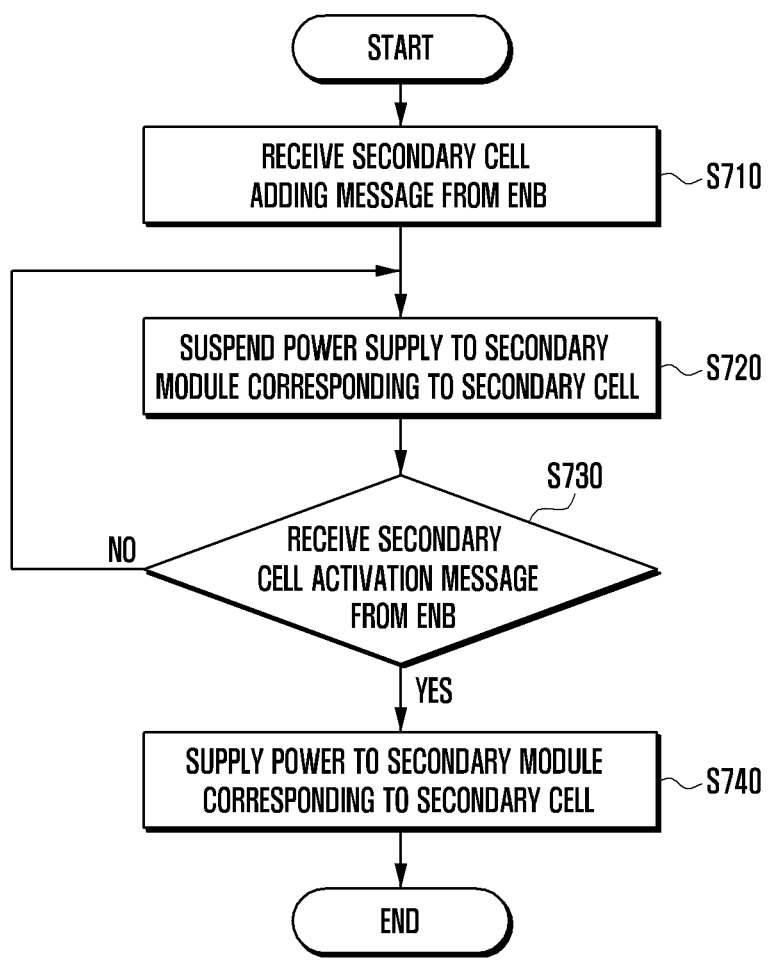
FIG. 7 is a flowchart illustrating a procedure of a UE according to an embodiment of the present invention.

FIG. 7 is a flowchart illustrating a procedure of a UE according to an embodiment of the present invention.

Referring to FIG. 7, the UE receives a secondary cell adding message from the eNB at step S710.

The UE suspends power supply to the secondary module corresponding to the secondary cell at step S720. For example, the UE configures the power mode of the secondary module to the power saving mode in spite of the receipt of the secondary cell adding message from the eNB.

According to various embodiments of the present invention, the power saving mode configuration may include that the UE controls to cut off or block the power supply to the RF module included in the secondary module, or that the UE controls to cut off or block the power supply to at least one internal sub-block of the modem included in the secondary module.

The UE determines whether the secondary cell activation message is received from the eNB at step S730.

If it is determined that the secondary cell activation message is not received, the UE returns the procedure to step S720 to maintain the power mode of the secondary module as the power saving mode.

If it is determined that the second cell activation message is received, the UE supplies power to the secondary module corresponding to the secondary cell at step S740.

Figure 8:
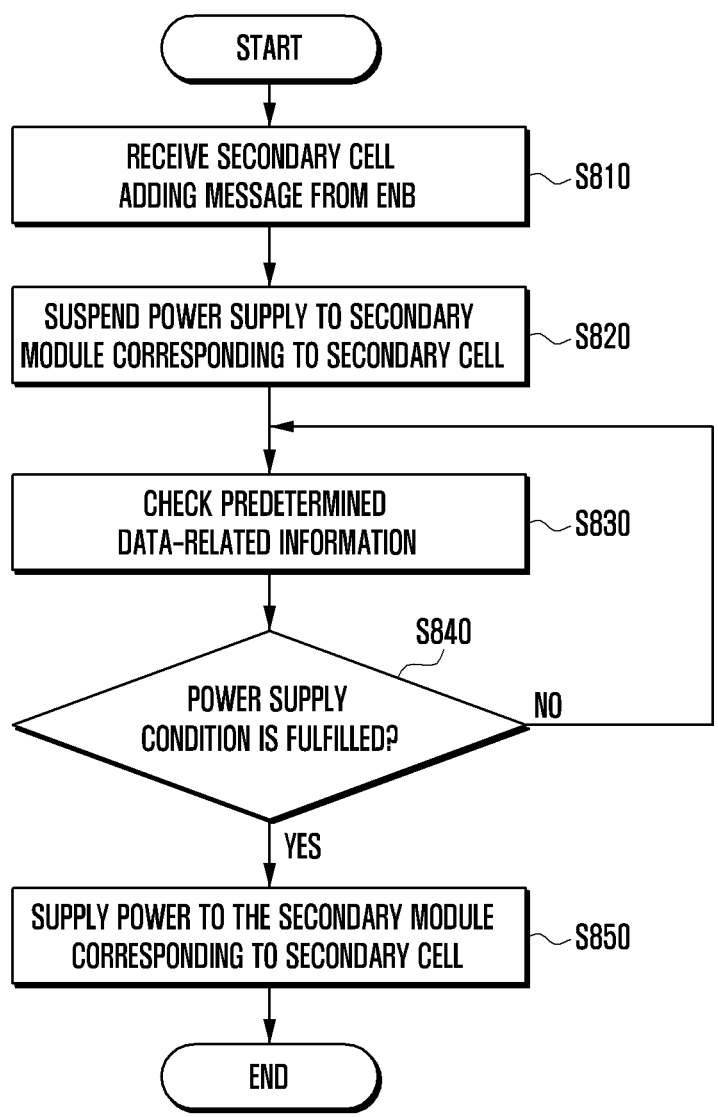
FIG. 8 is a flowchart illustrating a procedure of a UE according to an embodiment of the present invention.

FIG. 8 is a flowchart illustrating the operation procedure of the UE according to an embodiment of the present invention.

The UE receives a secondary cell adding message from the eNB at step S810.

The UE suspends power supply to the secondary module corresponding to the secondary cell at step S820. For example, the UE configures the power mode of the secondary module to the power saving mode in spite of the receipt of the secondary cell adding message from the eNB.

According to various embodiments of the present invention, the power saving mode configuration may include that the UE controls to cut off or block the power supply to the RF module included in the secondary module, or that the UE controls to cut off or block the power supply to at least one internal sub-block of the modem included in the secondary module.

The UE checks the predetermined data-related information at step S830. The UE checks at least one of throughput in the primary cell, type of application running on the UE, whether it is connected to a preset PDN, and preset service type.

For example, if the throughput in the primary cell is equal to or greater than a predetermined threshold, the UE controls to supply power to the secondary module, because as the throughput in the primary cell increases it is necessary to use both the primary and second cells simultaneously to process the increased data efficiently. According to various embodiments of the present invention, if it is possible to discriminate among bearers, the UE determines whether to supply power to the secondary module per bearer. For example, the UE determines whether to supply power to the secondary module depending on the bearer. As another example, if the bearer established with the eNB is Voice over LTE (VoLTE), the UE determines to supply power to the secondary module.

According to various embodiments of the present invention, if the UE connects to a specific PDN, it determines to supply power to the secondary module depending on the PDN to connect. The PDN may be classified into one of Intranet, Internet, and Private Network.

According to various embodiments of the present invention, if it is possible to discern a specific service such as Transmission Control Protocol (TCP), the UE determines whether to supply power to the secondary module depending on the kind of the service.

The UE determines whether a condition for power supply to the secondary module is fulfilled based on the check result of the data-related information at step S840.

If it is determined that the condition is not fulfilled, the UE returns the procedure to step S830 to continue checking the data-related information. For example, the UE monitors to determine whether the throughput of the primary cell is equal to or greater than a predetermined threshold continuously or periodically.

If it is determined that the condition is fulfilled, the UE supplies power to the secondary module corresponding to the secondary cell at step 850.

Figure 9:
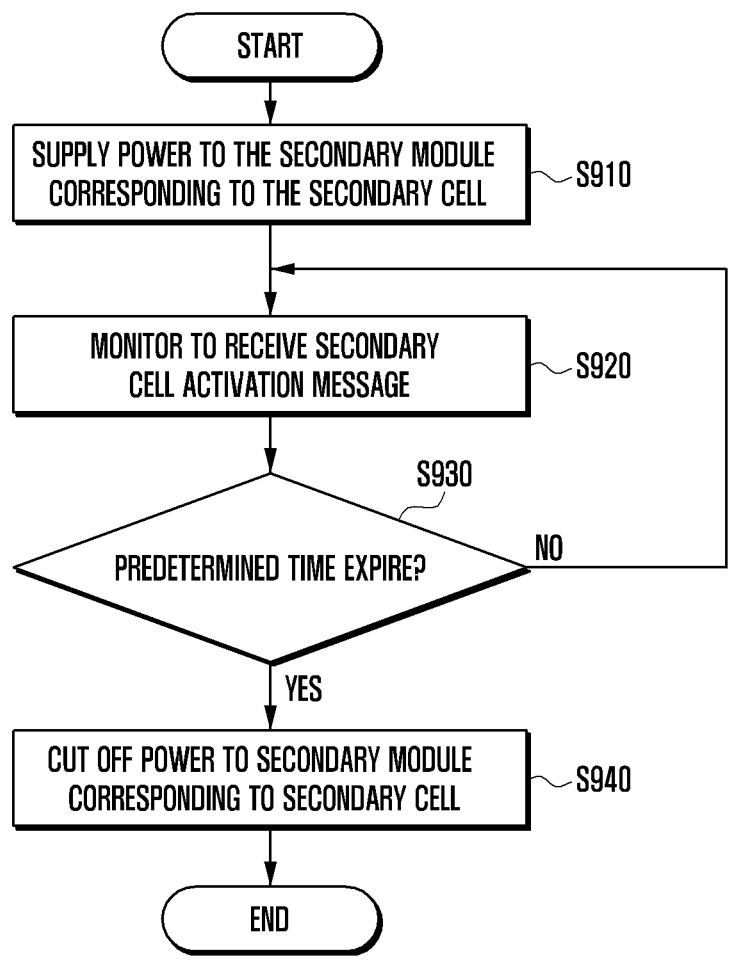
FIG. 9 is a flowchart illustrating a procedure of a UE according to an embodiment of the present invention.

FIG. 9 is a flowchart illustrating a procedure of a UE according to an embodiment of the present invention.

Referring to FIG. 9, the UE supplies power to the secondary module corresponding to the secondary cell at step S910. For example, the UE supplies power to the secondary cell when a secondary cell activation message is received after the receiving the secondary cell adding message or when the throughput in the first cell is greater than a predetermined threshold after receiving the secondary cell adding message. It is noted that the power supply to secondary module of the UE is not limited to a specific reason.

The UE monitors to detect the secondary cell activation message from the eNB at step S920.

The UE determines whether a predetermined time has expired at step S930.

If it is determined that the time has not expired yet, the UE returns the procedure to step S920 to continue monitoring to detect the secondary cell activation message from the eNB.

If it is determined that the time has expired, e.g. if no secondary cell activation message is received from the eNB before the end of the time, the UE cuts off the power to the secondary module corresponding to the secondary cell at step S940. For example, the UE configures the power mode of the secondary module to the power saving mode.

In FIG. 9, if the power is supplied to the secondary module due to at least one of predetermined reasons, the UE determines whether the secondary cell activation message is received from the eNB in a predetermined time. If the secondary cell activation message is not received from the eNB in the predetermined time, the UE cuts off the power supply to the secondary module.

Figure 10:
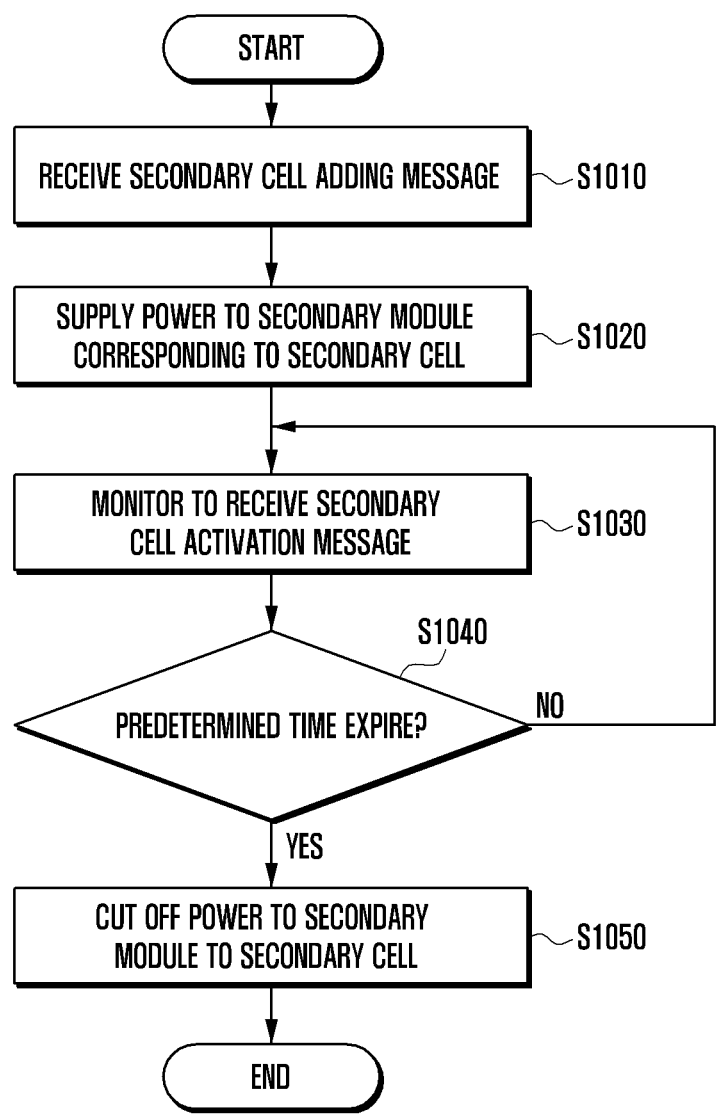
FIG. 10 is a flowchart illustrating a procedure of a UE according to an embodiment of the present invention.

FIG. 10 is a flowchart illustrating a procedure of a UE according to an embodiment of the present invention.

Referring to FIG. 10, the UE receives a secondary cell adding message from the eNB at step S1010.

At step S1020, the UE supplies power to the secondary module corresponding to the secondary cell upon receiving the secondary cell adding message.

The UE monitors to detect a secondary cell activation message from the eNB at step S1030.

The UE determines whether a predetermined time has expired at step S1040. If it is determined that the time has not expired yet, the UE returns the procedure to step S1030 to monitor to detect the secondary cell activation message from the eNB continuously or periodically.

If it is determined that the time has expired, the UE cuts off the power to the secondary module corresponding to the secondary cell at step S1050. For example, the UE configures the power mode of the secondary module to the power saving mode.

In various embodiments of the present invention that are described with reference to FIGS. 5 to 10, the UE receiving the secondary cell adding message may be replaced with the UE receiving a secondary cell deactivation message from the eNB.

According to an embodiment of the present invention, if the secondary cell adding message is received from the eNB when using only the primary cell, the UE operates in a secondary cell power supply standby state in which no power is supplied to the secondary module corresponding to the secondary cell. If the secondary cell deactivation message is received from the eNB when the secondary cell is activated, the UE operates in the secondary module power supply standby state in which no power is supplied to the secondary module corresponding to the secondary cell.

According to an embodiment of the present invention, the UE may not cut off the power before the end of a predetermined time. This prevents frequent power on/off operations from consuming extra power.

Figure 11:
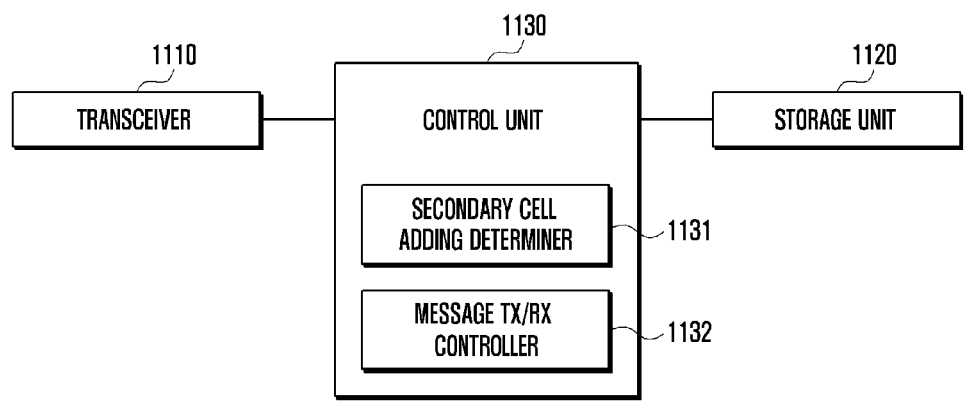
FIG. 11 is a block diagram illustrating an eNB according to an embodiment of the present invention.

FIG. 11 is a block diagram illustrating an eNB according to an embodiment of the present invention.

As shown in FIG. 11, the eNB includes a transceiver 1110, a storage unit 1120, and a control unit 1130.

The transceiver 1110 transmits and receives Radio Frequency (RF) signals to and from the UE using the radio resource. The signals transmitted and received by the transceiver 1110 may include control signals and data. If the eNB supports intra-eNB carrier aggregation, the transceiver may increase the number of carriers for data communication.

The storage unit 1120 stores various programs for operating the eNB. According to various embodiments of the present invention, the storage unit 1120 may include a buffer for storing signals (control signal and data) to be transmitted to the UE temporarily.

The control unit 1130 controls signal flows among the components for the terminal in order to operate as described in various embodiments of the present invention. According to an embodiment of the present invention, the control unit 1130 checks the data-related information on the data to be transmitted and received to and from the UE after transmitting the primary cell configuration message to the UE. The control unit 1130 determines whether to transmit the secondary cell adding message for configuring a secondary cell to the UE depending on the check result.

The secondary cell adding determiner 1131 may check at least one of size of data per second for input to the buffer of the eNB, whether it corresponds to a specific bearer, whether it is connected to a preset packet data network (PDN), and preset service type. If it is determined that the condition for adding the secondary cell to the UE is fulfilled as a check result, the secondary cell adding determiner 1131 determines to add the secondary cell to the UE and generates a signal notifying of the determination to the message transmission/reception controller 1132.

For example, when the data-related information is the size of data per second for input to the buffer of the eNB, if the size of data input to the buffer of the eNB per second is equal to or greater than a predetermined threshold value, the secondary cell adding determiner 1131 determines to send the UE the secondary cell adding message.

The message transmission/reception controller 1132 controls to transmit and receive messages to and from the UE and process the messages. For example, if a secondary cell adding determination signal is received from the secondary cell adding determiner 1131, the message transmission/reception controller 1132 controls to generate and transmit a secondary cell adding message to the UE.

Although the control unit 1130, the secondary cell adding determiner 1131, and the message transmission/reception controller 1132 constituting the eNB are depicted as separate blocks in the drawing, the present invention is not limited to this configuration. For example, the operation of the secondary cell adding determiner 1131 may be performed by the control unit 1130.

Figure 12:
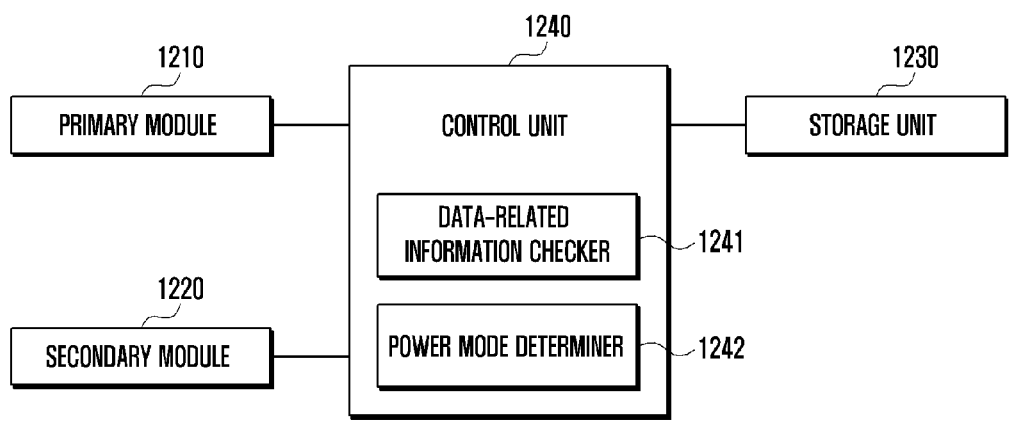
FIG. 12 is a block diagram illustrating a UE according to an embodiment of the present invention.

FIG. 12 is a block diagram illustrating a UE according to an embodiment of the present invention.

As shown in FIG. 12, the UE includes a primary module 1210, a secondary module 1220, a storage unit 1230, and a control unit 1240.

The primary module 1210 includes a primary RF module responsible for transmitting and receiving to and from the eNB using the radio resource of the primary frequency corresponding to the primary cell and a primary modem responsible for coding/decoding and modulation/demodulation.

The secondary module 1220 includes a secondary RF module responsible for transmitting and receiving to and from the eNB using the radio resource of the secondary frequency corresponding to the secondary cell and a secondary modem responsible for coding/decoding and modulation/demodulation.

Although FIG. 12 shows one primary module 1210 and one secondary module 1220, the UE may include additional secondary modules, if the number of available radio frequencies is three or more.

The storage unit 1230 stores various programs for operating the UE.

The control unit 1240 controls signal flows among the function blocks for the UE to operate according to various embodiments of the present invention. According to an embodiment of the present invention, if a secondary cell adding message for adding a secondary cell is received from the eNB, the control unit 1240 checks the data-related information on the data transmitted/received by at least one of the primary and secondary modules. The control unit 1240 controls to determine the power mode of the secondary module depending on the check result. According to various embodiments of the present invention, the control unit 1240 includes a data-related information checker 1241 and a power mode determiner 1242.

The data-related information checker 1241 checks at least one of throughput in the primary cell, type of application running on the UE, whether it is connected to a preset PDN, and preset service type. The data-related information checker 1241 also determines whether the data-related information fulfills a predetermined condition and transfers the determination result to the power mode determiner 1242.

If the data-related information does not fulfill the predetermined condition, the power mode determiner 1242 configures the power mode of the secondary module to the power saving mode.

According to an embodiment of the present invention, the power saving mode configuration may include that the power mode determiner 1242 controls to cut off or block power supply to the RF module included in the secondary module, or that the power mode determiner 1242 controls to cut off or block power supply to at least one internal sub-block of the modem included in the secondary module.

Although the control unit 1240, the data-related information checker 1241, and the power mode determiner 1242 constituting the UE are depicted as separate blocks in the drawing, the present invention is not limited to this configuration. For example, the operation of the data-related information checker 1241 may be performed by the control unit 1240.

Figure 13:
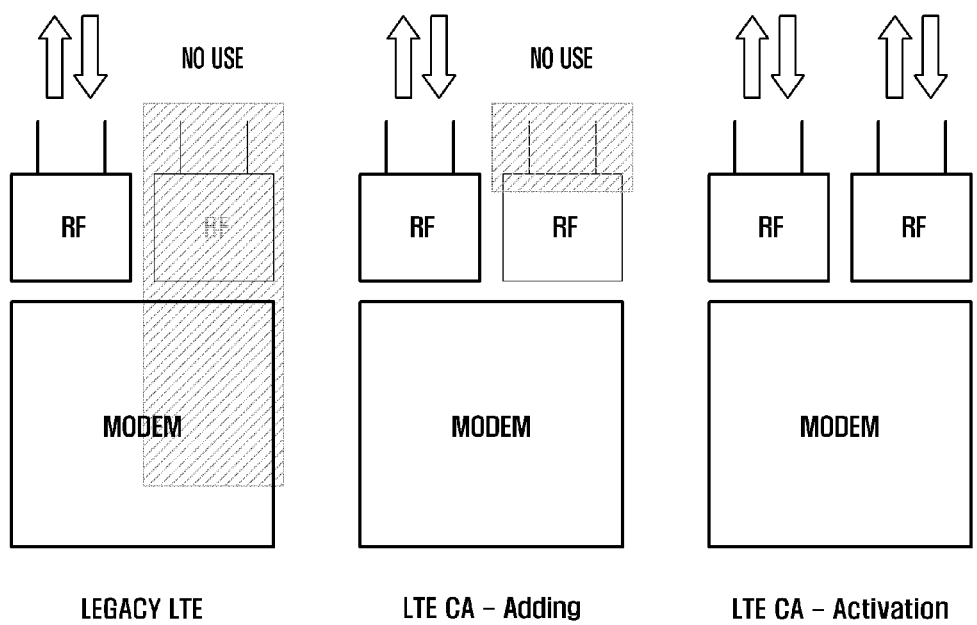
FIG. 13 is a diagram illustrating operation states of a UE according to the conventional technology.

FIG. 13 is a diagram illustrating operation states of a UE according to the conventional technology. FIG. 13 is depicted under the assumption that the UE is the LTE-CA UE capable of using multiple aggregated frequencies.

The legacy LTE UE of FIG. 13 supplies power to the RF module for the primary cell communication of the two RF modules to communicate signals with the eNB.

In FIG. 13, if a secondary cell is added for the LTE UE, the LTE-CA UE supplies power to the other RF module even when there is no actual data (traffic) to be transmitted/received by the other RF module, resulting in waste of electricity.

If a secondary cell activation command is received from the eNB, the LTE-CA UE communicates data with the eNB through the two RF modules.

Figure 14:
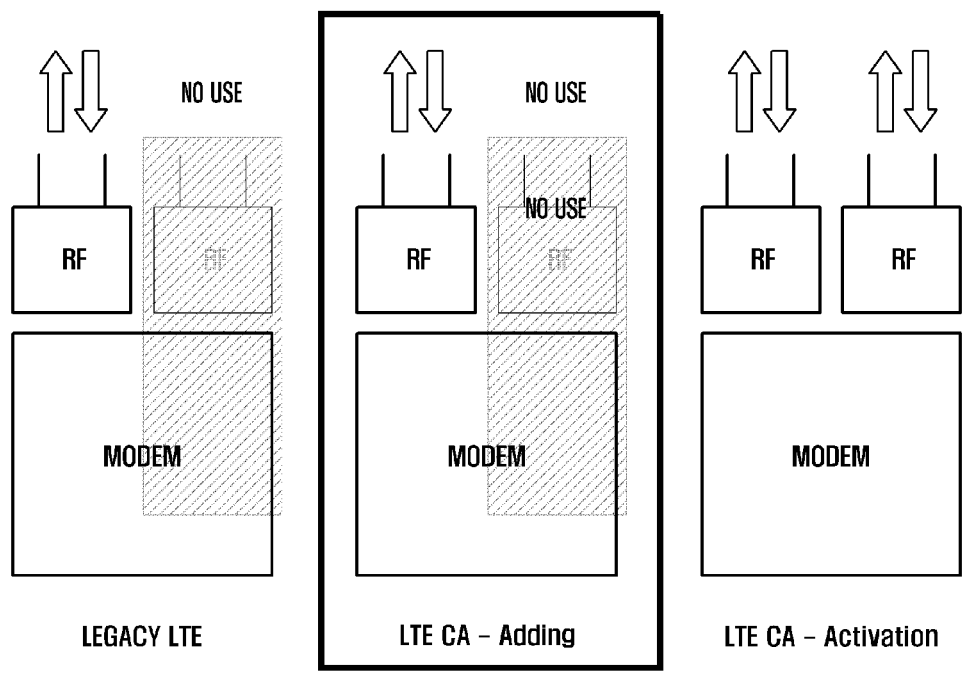
FIG. 14 is a diagram illustrating operation states of a UE according to an embodiment of the present invention.

FIG. 14 is a diagram illustrating operation states of a UE according to an embodiment of the present invention. FIG. 14 is depicted under the assumption that the UE is the LTE-CA UE capable of using multiple aggregated frequencies.

In FIG. 14, the LTE UE first supplies power to the RF module for the primary cell communication of the two RF modules to communicate signal with the eNB.

In FIG. 14, although a secondary cell is added for the LTE UE, the LTE-CA UE suspends supplying power to the RF module corresponding to the secondary cell. The LTE-CA UE may supply power to the RF module corresponding to the secondary cell when a predetermined condition is fulfilled as described in various embodiments of the present invention.

If a secondary cell activation command is received from the eNB, the LTE-CA UE supplies power the other RF module corresponding to the secondary cell to communicate with the eNB through the two RF modules.

As described above, the power control method and apparatus according to an embodiment of the present invention is capable of allowing an eNB to add secondary carrier for a UE only when a predetermined condition is fulfilled, so as to prevent the UE from wasting power unnecessarily. Also, the power control method and apparatus of the present invention is capable of allowing the UE to supply power to the secondary module only when a predetermined condition is fulfilled even when a secondary carrier adding message is received, thereby avoiding unnecessary power consumption.

As described above, the power control method of the present invention is capable of controlling the power of the UE in such a way that the base station instructs the UE to add carriers only when a specific condition is fulfilled. Also, although a carrier adding message is received from the base station, the UE determines power supply to the extra module depending on whether the specific condition is fulfilled so as to manage the power efficiently.

Although various embodiments of the present invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention as defined by the appended claims and their equivalents.

What is claimed is:

1. A power control method of a terminal including a primary module for primary cell communication and a secondary module for secondary cell communication in a wireless communication system, the method comprising:
   receiving, from a base station, a secondary cell adding message for adding a secondary cell when at least part of the secondary module is in a deactivated state such that the terminal is performing communication only by the primary cell communication;
   in response to receiving the secondary cell adding message, identifying data-related information on data communicated through the primary module when the at least part of the secondary module is in the deactivated state;
   in response to the secondary cell adding message, maintaining the at least part of the secondary module in the deactivated state, when the identified data-related information does not fulfill a predetermined condition; and
   in response to the secondary cell adding message, changing a power mode of the at least part of the secondary module from the deactivated state into an activated state for the secondary cell communication, when the identified data-related information fulfills the predetermined condition.

2. The method of claim 1, wherein identifying the data-related information comprises identifying the data-related information using at least one of a type of application running on the terminal, whether the terminal is connected to a predetermined Packet Data Network (PDN), and a predetermined service type.

3. The method of claim 1, wherein changing the power mode comprises supplying power to a Radio Frequency (RF) module included in the secondary module.

4. The method of claim 1, wherein changing the power mode comprises supplying power to at least one sub-block of a modem included in the secondary module.

5. The method of claim 1, wherein the primary cell communication and the secondary cell communication are performed by a same communication protocol, and
   wherein a communication frequency band of the primary cell communication is different from a communication frequency band of the secondary cell communication.

6. A terminal comprising:
   a primary module configured to communicate through a primary cell;
   a secondary module configured to communicate through a secondary cell; and
   a control unit configured to:
      receive, from a base station using the primary module, a secondary cell adding message for adding the secondary cell when at least part of the secondary module is in a deactivated state such that the terminal is performing communication only by the primary cell,
      in response to receiving the secondary cell adding message, identify data-related information on data communicated through the primary module when the at least part of the secondary module is in the deactivated state,
      in response to the secondary cell adding message, maintain the at least part of the secondary module in the deactivated state, when the identified data-related information does not fulfill a predetermined condition, and
      in response to the secondary cell adding message, change a power mode of the at least part of the secondary module from the deactivated state into an activated state for the secondary cell communication, when the identified data-related information fulfills the predetermined condition.

7. The terminal of claim 6, wherein the control unit is further configured to identify the data-related information using at least one of a type of application running on the terminal, whether the terminal is connected to a predetermined Packet Data Network (PDN), and a predetermined service type.

8. The terminal of claim 6, wherein the control unit is further configured to supply power to a Radio Frequency (RF) module included in the secondary module, when the identified data-related information fulfills the predetermined condition.

9. The terminal of claim 6, wherein the control unit is further configured to supply power to at least one sub-block of a modem included in the secondary module, when the identified data-related information fulfills the predetermined condition.

10. The terminal of claim 6, wherein the primary cell communication and the secondary cell communication are performed by a same communication protocol, and
   wherein a communication frequency band of the primary cell communication is different from a communication frequency band of the secondary cell communication.

* * * * *